United States Patent [19]

Steele

[11] 4,345,745
[45] Aug. 24, 1982

[54] PIPE CUTTER FOR END CUTS OF TUBULAR MATERIAL

[76] Inventor: Richard J. Steele, 2202 Harwell, Houston, Tex. 77026

[21] Appl. No.: 292,407

[22] Filed: Aug. 13, 1981

[51] Int. Cl.³ .............................................. B23K 7/04
[52] U.S. Cl. ...................................................... 266/56
[58] Field of Search ..................................... 266/56, 54

[56] References Cited

U.S. PATENT DOCUMENTS

| 1,852,412 | 4/1932 | Hickey | 266/56 |
| 2,146,959 | 2/1939 | Kugel | 266/56 |
| 2,623,742 | 12/1952 | Livesay | 266/56 |
| 3,173,979 | 3/1965 | Steele | 266/56 |

*Primary Examiner*—W. Stallard
*Attorney, Agent, or Firm*—Ranseler O. Wyatt

[57] ABSTRACT

A pipe cutter for forming end cuts in pipe, having a pair of annular torch holding members and an annular gear track connected to said members, and an annular vertically adjustable supporting member in which said torch holding members are concentrically mounted, said supporting member being rotatably mounted on vertically adjustable stands, and said stands being mounted on a pivotal base. The torch supporting members, having a cutting torch mounted thereon and a motor for rotating said torch supporting members, are mounted on said vertical supporting member, on rollers, said rollers being provided with braking means to control the speed of rotation of said supporting members. A torch holder, which adjustably holds the cutting torch in the desired position, the torch being suspended from said holder and having means for yieldably maintaining the horizontal position of the torch relative to the torch holder mounted on the vertical supporting members, reciprocates on a plate secured to the torch supporting member, a motor on said plate providing rotation to a threaded shaft on which said torch holder is mounted.

6 Claims, 5 Drawing Figures

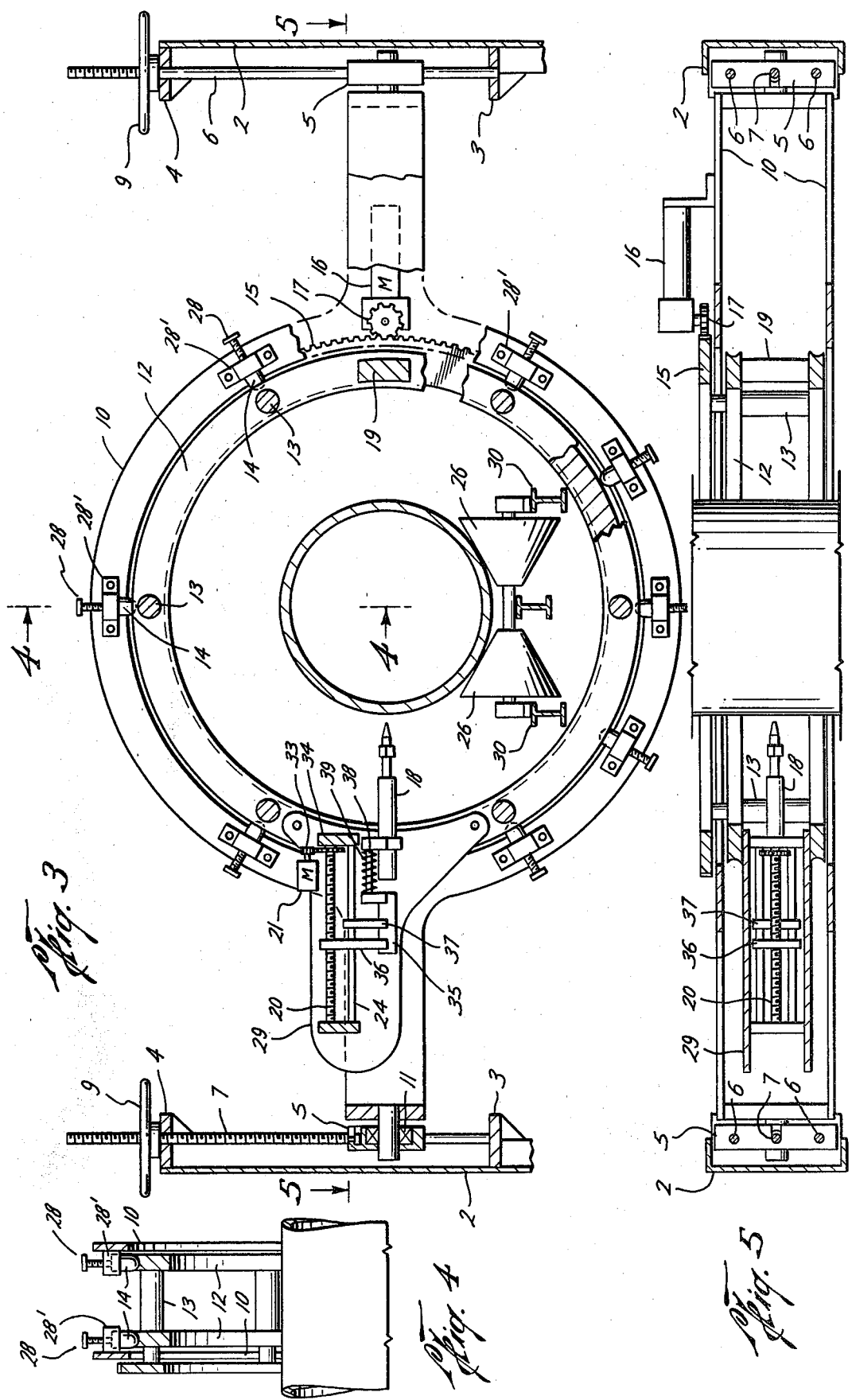

PIPE CUTTER FOR END CUTS OF TUBULAR MATERIAL

SUMMARY OF THE INVENTION

A pipe cutter for forming end cuts on pipe, a pair of annular rotating torch supports mounted in an annular supporting member, said annular supporting member being pivotally mounted on a pair of vertically adjustable stands and said stands being mounted on a pivotal base, said rotating torch supports having cutting torches adjustably mounted therein and having power means for rotating said torch supporting members within said annular supporting members.

BACKGROUND OF THE INVENTION

In forming end cuts on pipe, it is necessary to make straight cuts and angle cuts, preparatory to welding the pipe ends to vessels, or other pipe, many of such cuts being designed to enter a vessel or other pipe at an angle, requiring an accurate pattern for the cut. Many cuts of this kind are now performed with the use of templates, which must be carefully prepared by expert artisans and which are difficult for the average workman to follow with the degree of accuracy necessary for a good fit. It is an object of this invention to provide a device that may be preset by an operator, by use of protractors and measuring data mounted on the device, to effect the angle of cut desired and where multiple cuts at the same angle are desired, these cuts can be effected with minimum labor and with exact accuracy.

BRIEF DESCRIPTION OF THE DRAWINGS

FIG. 3 is an enlarged view of the annular supporting members, partially in cross section.

FIG. 4 is a fragmentary view, in cross section, taken on the line 4—4 of FIG. 3, and FIG. 5 is a cross sectional top view taken on the line 5—5 of FIG. 4.

DESCRIPTION OF THE PREFERRED EMBODIMENT

Figure 1:
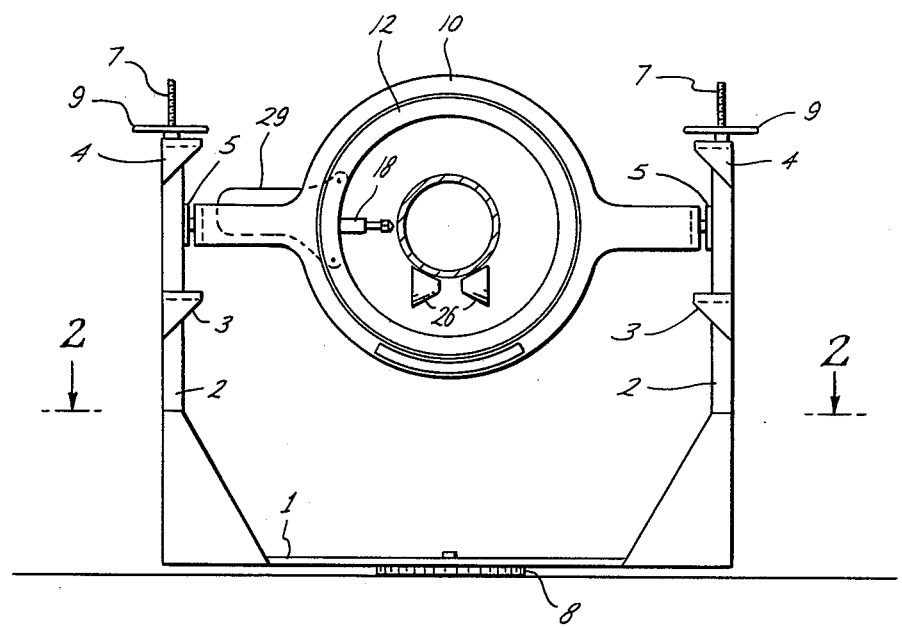
FIG. 1 is a front elevational view of the device.
Figure 2:
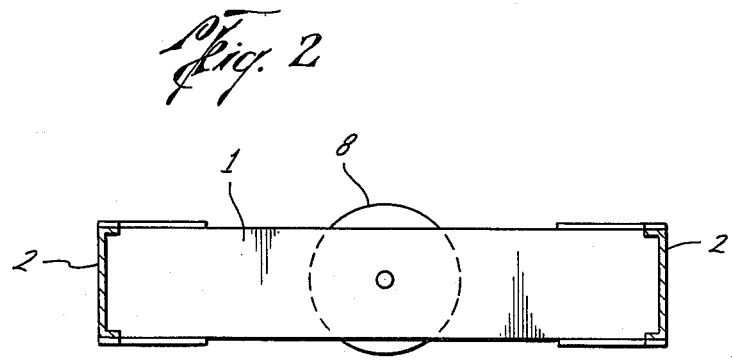
FIG. 2 is a cross sectional view taken on the line 2—2 of FIG. 1.

In the drawings, the numeral 1 designates a floor mounted on a pivotal base 8 and having the pair of facing vertical stands 2, 2 which are provided with the shelf 3 and top 4. A vertically adjustable block 5 is mounted on each stand between the shelf 3 and top 4, and guide rods 6, 6 maintain the block in alignment, and the threaded shaft 7 provides means for raising and lowering the block 4 which may be accomplished by rotating the handle 9 on the shaft 7.

Pivotally mounted in the blocks 5, 5 are the ends of the annular supporting member 10, which are provided with suitable bearings 11, 11. A pair of rotating annular torch supporting members 12, 12 are mounted concentrically in the supporting member 10, and said members 12, 12 are separated by spacers 13, 13 and rollers 14, 14 mounted on the members 10, 10, rotate in the concave peripheral margins of the torch supporting members 12, 12. Adjustable screws 28, 28 are mounted in the roller holders 28' and bear against the rollers, which rotate in the concave peripheral margins of the members 12, 12, and may be adjusted to vary the position of said support members 12, 12 with relation to the supporting member 10. A gear track 15 is mounted on the side wall of one of said torch supporting members 12, and a motor 16, mounted on one of the annular supporting members 10, rotates the gear track 15 by means of the gear 17. A cutting torch 18 is mounted on the plate 29 on the inside wall of a cutting torch supporting member 12 and a counterweight 19 is mounted on the supporting members 12, 12 diametrically opposite the cutting torch.

The cutting torch 18 is slidably mounted on a rod 24, which is mounted on the plate 29, between the supporting members 10, 10; a connecting shaft 36, extending from the hanger 35, is in engagement with the externally threaded shaft 20 for horizontal movement of the torch 18 and the shaft 37 supports the hanger on the rod 24. The motor 21 provides rotation to the shaft 20 through the gears 33, 34, to move the torch horizontally. The torch 18 is yieldably suspended from the hanger by the shaft 38, the torch moving horizontally on said shaft 38, against the spring 39, which will constantly urge the torch into extended position. Thus the torch may yield if brought into contact with the pipe to be cut, but upon backing off the hanger the desired distance, the torch will be returned to extended position.

Bars, as 30, 30, having pipe receiving rollers 26 mounted thereon, lead into the annular torch supporting members and lead outwardly from said members, the rollers 26 carrying pipe through the annular torch supporting members, said rollers being formed of inwardly tapered cones for receiving varied size of pipe as defined in my companion application for patent filed herewith.

The bevel of the cut is determined by the adjustment of the base member 8, which permits swinging the floor 1 to position the torch at the desired longitudinal angle, and the supporting member 10, which rotates at the bearing 11, permitting tilting of the supporting members to position the torch for the desired bevel. The shafts 7 move the supporting members 10 vertically for vertical adjustment of the torch. Protractors are mounted at each point of movement, to aid in making these adjustments.

The operator of the device adjusts the angle of cut to be accomplished for the particular work, the protractors and other measuring units mounted at the respective points employed to perfect the desired layout, such as the positioning of the blocks 5, 5 vertically, and the consequent vertical positioning of the annular rotating torch supporting members 12. When these adjustments are made, the pipe to be cut is rolled into position in the rotating torch supporting members and the motor 21 activated to move the torch into position with relation to the pipe, and the motor 21 is activated, and the said torch supporting members rotated through the gears 15, 17, a half circle, then reversed back to the starting point and rotated a half circle in the opposite direction, effecting the cut. Where multiple cuts are desired, measuring units, such as a tape mounted on the central bar 30, may be employed to aid in moving the pipe on the roller for the successive cuts.

What I claim is:

1. In a pipe cutting device, a pair of annular torch supporting members, a cutting torch mounted on said members, a vertically adjustable annular member adapted to concentrically receive said torch supporting members, means for rotating said torch supporting members in a selected path of rotation.

2. The device defined in claim 1 wherein a peripheral gear is mounted on one of said torch supporting members, and a motor is mounted on one of said annular supporting members having a gear in mesh with the said peripheral gear for rotating said torch supporting members.

3. The device defined in claim 1 having vertical stands, said supporting members being pivotally mounted in said stands and being adjustable vertically therewith.

4. The device defined in claim 1, wherein said torch supporting members have concave peripheral margins and are spaced apart with spacers and rollers are mounted on said vertically adjustable annular member and bear against the said concave margins of said torch supporting members.

5. The device defined in claim 1 wherein a counterweight on said torch supporting members is mounted diametrically opposite said cutting torch and maintains said supporting members in balance.

6. The device defined in claim 1 wherein torch supporting members have concave peripheral margins and said vertically adjustable annular member has rollers mounted thereon bearing against the concave peripheral face of the rotating torch supporting members, and braking means are provided for bearing against said rollers to selectively determine the speed of rotation of said torch supporting members.

* * * * *